United States Patent [19]

Long

[11] Patent Number: 4,610,599
[45] Date of Patent: Sep. 9, 1986

[54] APPARATUS FOR CONTROLLING A HYDRAULIC TURBINE

[75] Inventor: Ray A. Long, Mountville, Pa.

[73] Assignee: Allis-Chalmers Corporation, Milwaukee, Wis.

[21] Appl. No.: 528,871

[22] Filed: Sep. 1, 1983

[51] Int. Cl.[4] .......................... F01D 17/26; F01B 9/03
[52] U.S. Cl. ........................................ 415/15; 415/48; 415/130; 91/6; 91/20; 91/444
[58] Field of Search .................. 415/1, 14, 19, 21, 29, 415/15, 40, 41, 42, 48, 130; 91/6, 20, 31, 361, 363 R, 450, 459, 444

[56] References Cited

U.S. PATENT DOCUMENTS

| | | | |
|---|---|---|---|
| 2,132,504 | 10/1938 | Whisler | 415/19 |
| 2,331,507 | 10/1943 | Ring et al. | 415/41 |
| 3,051,137 | 8/1962 | Kutzer | 91/363 R X |
| 3,106,084 | 10/1963 | Hoffman et al. | 91/363 R X |
| 3,118,281 | 1/1964 | Gros | 415/130 X |
| 3,596,561 | 8/1971 | Keller | 91/20 |
| 3,802,318 | 4/1974 | Sibbald | 91/363 R X |
| 4,137,004 | 1/1979 | Kuwabara et al. | 415/1 |
| 4,367,624 | 1/1983 | Ogata et al. | 91/6 X |

FOREIGN PATENT DOCUMENTS 1156004  5/1959  France .................. 415/21

Primary Examiner—Robert E. Garrett
Assistant Examiner—Joseph M. Pitko
Attorney, Agent, or Firm—Timothy R. Conrad; Arthur M. Streich

[57] ABSTRACT

An apparatus for controlling a hydraulic turbine is disclosed comprising a hydraulic circuit to control the positioning of turbine runner blades and a hydraulic circuit to control the positioning of turbine wicket gates. The runner blade hydraulic circuit comprises a solenoid valve for normal operation of the blades and a slow rate servovalve for moving the blades when the actual blade position differs from a desired position by less than a predetermined tolerance. The wicket gate circuit comprises a solenoid valve for normal control of the gates. A diverter directs flow from the solenoid valve to a flow rate control valve when the difference between the actual and desired position of the gates is less than a second predetermined tolerance.

5 Claims, 1 Drawing Figure

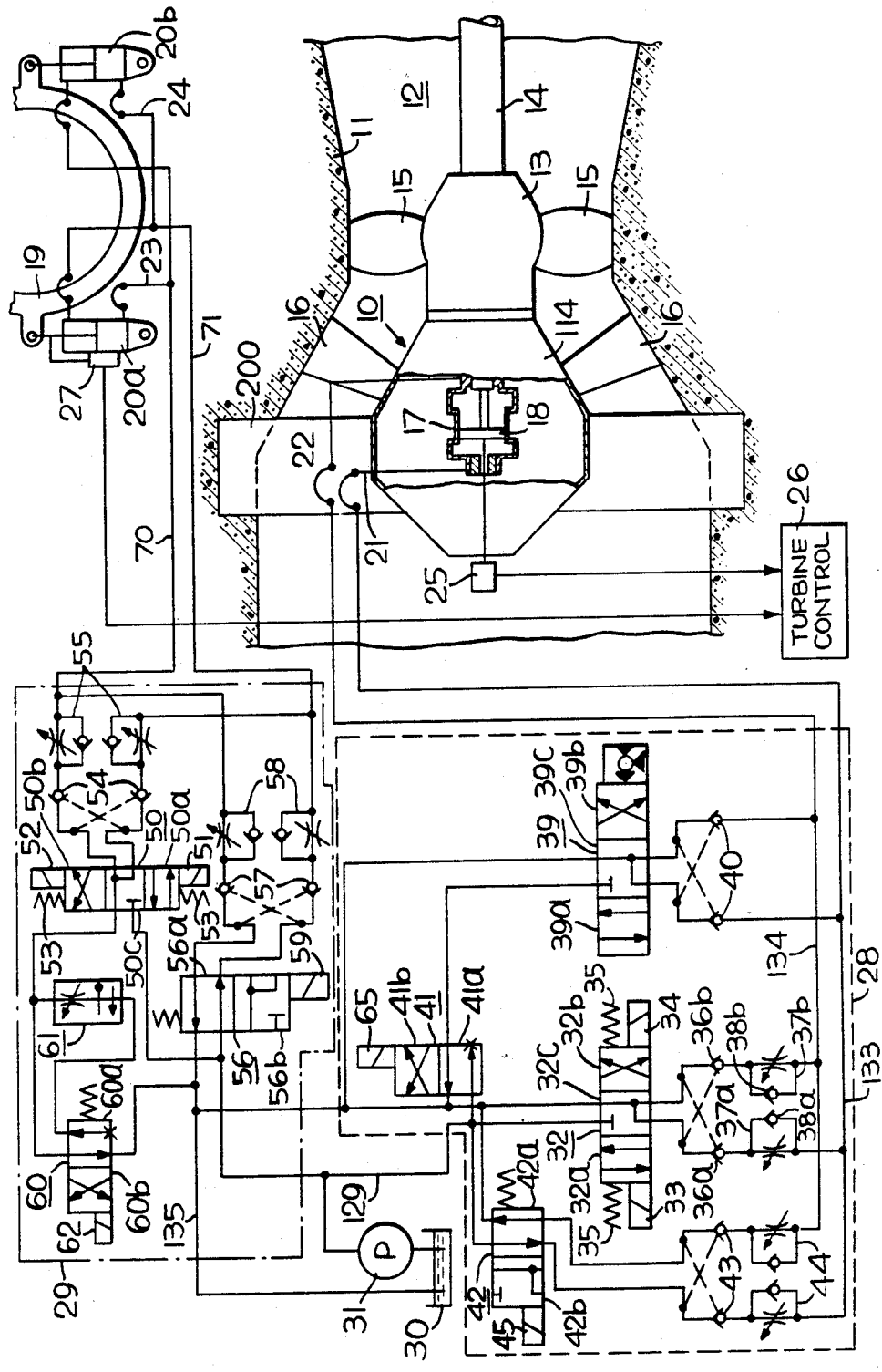

APPARATUS FOR CONTROLLING A HYDRAULIC TURBINE

BACKGROUND OF THE INVENTION

1. Field of the Invention

This invention relates to an apparatus for controlling a hydraulic turbine. More particularly, this invention relates to an apparatus for controlling the position of adjustable wicket gates and adjustable runner blades of a hydraulic turbine

2. Description of the Prior Art

In the prior art, hydraulic turbines are well known having adjustable runner blades and adjustable wicket gates. Historically, apparatus for controlling the position of the wicket gates and runner blades has been predominantly mechanically actuated Examples of such may be found in U.S. Pat. No. 2,331,507 to Ring dated Oct. 12, 1943 and U.S. Pat. No. 2,132,504. Electrohydraulic apparatus have been developed to perform the wicket gate and turbine blade adjustments previously performed by mechanical systems. An example may be found in U.S. Pat. No. 4,137,004. Such hydraulic systems use electrical means for determining the actual position of hydraulic turbine wicket gates or runner blades. The actual position of the blades is compared with a desired position and an electrical signal is sent to a hydraulic circuit for operating a hydraulic motor which affects adjustment of the blades or wicket gates. The hydraulic motor is commonly a cylinder having a reciprocating piston with the piston connected through linkage, well known in the art, for affecting adjustment of the blades and wicket gates.

In prior art positioning apparatus, the hydraulic circuits were controlled by means of a solenoid valve or a servovalve. A solenoid valve is a valve which, for example, may assume one of three states. That is, the valve has a forward state, a neutral state and a reverse state. When a proper electronic signal is received by the valve, the valve assumes either of the three states such that when in the forward state, a hydraulic circuit is completed tending to urge the blades or wicket gates toward an open position. When the valve assumes a neutral state, no hydraulic circuit is completed and the blades and wicket gates are not permitted to move. When in the reverse state, the valve completes a hydraulic circuit such that the blades or wicket gates are caused to move toward a closed position. Solenoid valves may conveniently be referred to as digitally responsive. That is, when the valve is in the forward or reverse state, the rate of flow permitted through the valve is constant. As a result, the valve is either fully on (in a reverse or forward state) or fully off. The use of such valves to control the position of hydraulic turbine runner blades presents several problems in the art. Namely, the circuit which provides hydraulic fluid to the hydraulic motor which positions the runner blades is susceptible to hydraulic leakage such that the blades tend to wander from their desired position. As a result, the solenoid valve must be constantly turned on and off between the forward and reverse states to constantly move the runner blades into their desired position to make up for the loss of hydraulic fluid. Such a method of operation is commonly referred to as a "bang-bang" approach where the hydraulic turbine runner blades are permitted to drift away from their desired position by a predetermined tolerance at which point the solenoid valve is turned on in either the reverse or forward state to urge the blades back to their desired position. When the blades are within the predetermined tolerance range, the solenoid valve is in its neutral state. Accordingly, a turbine positioner which operates on a single solenoid valve must permit some degree of inaccuracy in the position of the turbine blades.

Another method of completing a hydraulic circuit to affect positioning of turbine blades and wicket gates is the use of a servovalve which has three states (reverse, forward and neutral) such that the circuit operates in the same manner as the solenoid valve when the servovalve assumes one of the three states. The servovalve system differs from the solenoid system in that a servovalve is proportionally responsive. For example, the servovalve receives a signal of varying current. When the current is positive, the servovalve is urged to the forward state. When the current is negative, the servovalve is moved to the reverse state and when no current is admitted to the servovalve, the servovalve assumes the neutral state. Unlike a solenoid valve, a servovalve can regulate the amount of flow through the valve when in the reverse and forward state. That is, the servovalve is responsive to the absolute value of the current signal such that the flow rate through the valve is adjustable from zero to some maximum flow rate when in either of the forward or reverse state. A problem which has arisen in operation of a hydraulic circuit using a servovalve for controlling hydraulic turbine blades and wicket gate is the size of the valve results in inaccuracies in adjustments of the blades. The maximum flow rate through a servovalve is selected so that a complete stroke of turbine runner blades may be achieved within a desired amount of time. However, in the case where a turbine blade wanders as a result of loss of hydraulic fluid in the circuit, only a small flow rate is needed to affect realignment of the blades. At low flow rates, such large capacity servovalves are inaccurate and unpredictable.

It is an object of the present invention to provide an apparatus for controlling the operation of a hydraulic turbine which employs a hydraulic circuit which is responsive to fluctuations of turbine blades as a result of loss of hydraulic fluid but which is of sufficient capacity to operate the turbine blades through the entire desired stroke. A further object of the present invention is to provide an apparatus for controlling a hydraulic turbine which comprises a solenoid valve and a servovalve arranged in parallel with the solenoid valve operating the control of the turbine blades to within a predetermined tolerance with the servovalve completing positioning of the turbine blades.

SUMMARY OF THE INVENTION

According to a preferred embodiment of the present invention, there is provided an apparatus for controlling the position of hydraulic turbine runner blades having apparatus for sensing the actual positioning of the blades and comparing the actual position to a predetermined desired position. A solenoid valve is provided for selectively admitting fluid under pressure to a hydraulic motor to affect positioning of the blades when the actual position of the blades differs from the desired position by a predetermined tolerance. A servovalve, having a maximum flow rate slightly greater than the anticipated loss of fluid in the hydraulic circuit, is provided for selectively admitting fluid under pressure to the hydraulic motor when the actual position of the blades differs from the predetermined position by an amount less than the predetermined tolerance.

BRIEF DESCRIPTION OF THE DRAWING

The single FIGURE is a schematic representation of a hydraulic turbine showing a partial representation of a hydraulic turbine wicket gate operating ring and a schematic representation of a hydraulic circuit for controlling the position of the turbine runner blades and the wicket gate operating ring.

DESCRIPTION OF THE PREFERRED EMBODIMENT

Referring to the FIGURE, a hydraulic turbine 10 is schematically shown having a turbine foundation 11 defining a water passageway 12. The turbine, comprises a rotary runner hub 13 having an axially extending shaft 14 secured thereto. A plurality of radially extending turbine runner blades 15 are rotatably secured to the runner hub 13. The runner hub 13 is supported for rotation by a housing 114 which is secured within the water passageway 12 by means of vertical stay tower 200. Contained within the housing is a hydraulic cylinder 17 having a reciprocating piston 18 disposed within the cylinder 17. The piston 18 is operably connected by means, not shown, to the turbine blades 15 such that reciprocal motion of the piston 18 within the cylinder 17 causes rotary motion of the turbine blades 15 between fully open positions and fully closed positions as the piston 18 moves a full reciprocal stroke. A wicket gate operating ring 19 is schematically shown as having two servomotors 20a and 20b operably connected to rotate the wicket gate operating ring 19 between open and closed positions to effect opening and closing of a plurality of wicket gates 16 which control the flow of water to the turbine runner.

To effect reciprocal motion of the piston 18 within the cylinder 17, first and second fluid inlet means 21 and 22, respectively, are provided such that admission of a fluid under pressure to the first inlet means 21 urges the reciprocating piston 18 to move within the cylinder 17 causing the turbine runner blades 15 to move toward a full open position. An admission of fluid under pressure to the second inlet 22 urges the piston 18 to move in the opposite direction causing the turbine runner blades 15 to rotate to a fully closed position. Likewise, the wicket gate operating ring is provided with first and second fluid inlets 23 and 24, respectively, such that a pressurized fluid admitted through the first inlet 23 urges the ring to rotate to a fully open position and admission of fluid under pressure to the second inlet 24 urges the ring to move toward a fully closed position.

The actual position of the turbine runner blades 15 is detected by means of a position feedback transducer 25. Such position detection means are well known in the art and generally comprise a potentiometer mechanically connected to the reciprocating piston 18 such that reciprocal motion of the piston 18 within the cylinder 17 results in varying the resistance of the potentiometer. Through calibration, the resistance across the potentiometer can readily be translated to indicate the actual position of the turbine blades 15. The position of the turbine blades 15 as indicated by the position feedback transducer is sent by means of a signal to a turbine control 26 which will be described more fully hereafter. Likewise, the position of the gate operating ring 19 is detected by means of a position feedback transducer 27 which generates a signal proportional to the position of the gate operating ring and sends the signal to the turbine control 26.

To effect positioning of the wicket gates and the turbine blades, an electro-hydraulic positioner system is provided which comprises a first hydraulic circuit (enclosed within the dashed line 28) for controlling the position of the turbine runner blades and a second hydraulic circuit (enclosed with the dot and dashed line 29), in parallel with the first hydraulic circuit, for controlling the position of the wicket gate operating ring 19. The first hydraulic circuit 28 has a feed line 129 operably connected to a source of a pressurized hydraulic fluid as indicated by the tank 30 and the pump 31 for supplying fluid under pressure to the feed line 129. A three-way solenoid valve 32 is provided which has a forward state 32a, a reverse state 32b and a neutral state 32c. As schematically shown in the drawing, the solenoid valve 32 is shown in the neutral state 32c. Such solenoid valves are commercially available items and operate so that a signal sent to the first electromagnet 33 of the valve urges the solenoid valve into the forward state 32a and a signal to the second electromagnet 34 of the valve urges the valve into the reverse state 32b. When signals are not supplied to either of the first or second electromagnets of the solenoid valve, springs 35 urge the valve into the neutral state 32c. When in the forward state 32a, the solenoid valve 32 completes a hydraulic circuit such that the pressurized fluid from the feed line 129 is permitted to pass through the valve 32 to a blade open line 133 for admitting fluid under pressure to the first inlet 21 of the turbine hydraulic cylinder 17. Likewise, in the forward state 32a, the hydraulic circuit is complete so that fluid from the second inlet 22 is permitted to pass through a blade close line 134 through the valve 32 and into a return line 135 for depositing the fluid into the tank 30. When in the reverse state 32b, the valve 32 completes a hydraulic circuit such that pressurized fluid from the feed line 129 is permitted to pass through the valve 32 into the blade close line 134 for admitting the pressurized fluid into the second inlet 22 and urging the blades 15 of the runner 13 toward a fully closed position. When in the reverse state 32b, fluid is permitted to pass from the first inlet 21 through the blade open line 133 and pass through the valve 32 into the return line 135 for depositing the fluid into the tank 30. Connected in series with the solenoid valve are two pilot operated check valves 36a and 36b connected with the blade open line 133 and with the blade close line 134, respectively. The pilot operated check valves are arranged so that fluid is prevented to pass through the pilot operated check valves into the solenoid valve 32, but fluid flow is unrestricted from the solenoid valve 32 through the pilot operated check valves 36a and 36b into the open and close lines 133 and 134. When the valve 32 is in either of the forward or reverse states, both check valves are opened to permit pressurized fluid to flow through the desired direction into the desired line and to permit return flow through the valve 32 into the return line 135.

A flow rate control valve 37a is arranged in series with check valve 36a and the open line 133 and a like valve 37b similarly arranged between the check valve 36b and the close line 134. Each of the flow control valves is provided with parallel arranged check valves 38a and 38b which permit pressurized fluid to flow freely across each flow control valve 37a and 37b from the solenoid valve 32 to the open and closed lines, but restrict flow from the open and closed lines through the flow control valves to the solenoid valve 32. In this manner, the rate of flow through the solenoid valve 32 may be controlled by adjusting the valves 37a and 37b to control the rate of flow from the open or closed line to the return line 135.

Also provided in the first hydraulic circuit is a servovalve 39 arranged in parallel with the solenoid valve 32. The servovalve has a forward state 39a, a reverse state 39b, and a neutral state 39c and operates similar to the solenoid valve 32 in that when energized to the forward state 39a, flow is permitted under pressure through the valve 39 to the open line 133 for urging the turbine blades 15 toward an open position. When energized into the reverse state 39b, flow is permitted through the valve 39 under pressure to the close line 134 for rotating the turbine blades 15 toward a closed position. The servovalve 39 is a commercially available item and is adjustable so that it is responsive to a signal so it may regulate the amount of flow in both the forward and the reverse states. For example, the servovalve is responsive to a current signal so that a positive current urges the valve 39 to the forward state 39a and a negative current urges the valve 39 to the reverse state 39b. The magnitude of the current in either a negative value or a positive value determines the flow rate through the valve when in the reverse and forward states respectively. The absence of current to the servovalve causes the servovalve 39 to assume the neutral state 39c where no fluid flow passes through the valve 39. Arranged in series with the valve 39 are pilot operated check valves 40 which are similar in function and design as the previously described pilot operated check valves 36a and 36b, the description of which will suffice for the description of check valves 40.

A two-way solenoid valve 41 is provided for controlling the flow of pressurized fluid from the pressure feed line 129 to the servovalve 39. The solenoid valve has a first state 41a and second state 41b so that when de-energized the valve 39 assumes the first state and pressurized fluid is not permitted to flow through the solenoid 41 and hence no pressurized fluid flows to the servovalve 39. When energized, the valve 41 assumes the second state 41b and pressurized fluid is permitted to flow from the feed line 129 through the solenoid valve 41 to the servovalve 39. In the drawing, the solenoid valve 41 is shown in its normally closed de-energized position with the valve in the first state 41a preventing flow to the servovalve 39.

The first hydraulic circuit also includes an emergency solenoid valve 42 in parallel with both the first solenoid valve 32 and the servovalve 39. The emergency solenoid valve 42 is a two-way valve having a forward state 42a for permitting passage of pressurized fluid from the feed line 129 through the valve 42 to the blade open line 133 to urge the turbine runner blades to assume a full open position (which is a desired position in the event of an emergency). The emergency solenoid valve 42 also assumes a second position 42b which is a neutral position prohibiting flow of fluid through the solenoid valve 42. Arranged in series with the emergency solenoid valve 42 are pilot operated check valves 43 and flow rate control valves 44 which are equivalent to function and design with the previously described check valves and flow rate control valves, the description of which will suffice as a description of valves 43 and 44. As shown in the FIGURE, the emergency solenoid valve 42 is shown in its normally open de-energized position permitting flow through the valve 42 urging the blades to their full open position. A signal to the electromagnet 45 of the emergency solenoid valve 42 urges the valve to its closed position so that no fluid flows through the emergency solenoid valve 42.

A second hydraulic circuit 29 is provided for controlling rotation of the wicket gate operating ring. The second hydraulic circuit includes a three-way solenoid valve 50 having a forward state 50a, a reverse state 50b and a neutral state 50c. As schematically shown in the drawing, the solenoid valve is shown in the neutral state 50c. Like solenoid valve 32, the solenoid valve 50 is a commercially available item which operates by a signal sent to a first electromagnet 51 of the valve to urge the valve into the forward state 50a and a signal to a second electromagnet 52 of the valve to urge the valve into the reverse state 50b. When signals are not supplied to either of the first or second electromagnets, springs 53 urge the valve into the neutral state 50c. When in the reverse state 50b, the solenoid valve 50 completes a hydraulic circuit such that pressurized fluid from the feed line 129 is permitted to pass through the valve 50 to a wicket gate open line 70 for admitting fluid under pressure to the first inlets 23 of the wicket gate operating ring servomotors. Likewise, in the reverse state 50b, the hydraulic circuit is complete such that fluid from the second inlet 24 is permitted to pass through the wicket gate close line 71 through the valve 50 and into the return line 135 for depositing the fluid in the tank 30. When in the forward state 50a, the valve 50 completes a hydraulic circuit such that pressurized fluid from the feed line 29 is permitted to pass through the valve into the wicket gate close line 71 for admitting the pressurized fluid into the second inlets 24 and urging the wicket gate operating ring 19 to rotate toward a fully closed position. When in the forward state 50a, fluid is permitted to pass from the first inlets 23 through the wicket gate open line 70 and pass through the valve 50 into the return line 135 for depositing the fluid into the tank 30. Connected in series with the three-way solenoid valve 50 are pilot operated check valves 54 and fluid flow control valves 55. The pilot operated check valves 54 and fluid flow control valves 55 are equivalent in function and design as the previously described check valves and flow control valves, the description of which will here suffice.

The second hydraulic circuit also includes an emergency two-way solenoid valve 56 in parallel with the three-way solenoid valve 50. The emergency solenoid valve 56 has a forward state 56a for permitting passage of pressurized fluid from the feed line 129 through the valve to the wicket gate open line 70 to urge the wicket gate operating ring 19 to assume a full closed position (which is a desired position in the event of an emergency). The emergency solenoid valve also assumes a second position 56b which is a neutral position prohibiting flow of fluid through the solenoid valve 56. Arranged in series with the emergency solenoid valve 56 are pilot operated check valves 57 and flow rate control valves 58 which are equivalent in function and design with the previously described check valves and flow rate control valves. As shown in the FIGURE, the emergency solenoid valve is shown in its normally open de-energized position permitting flow through the valve 56 to urge the wicket gate operating ring 19 to its full closed position. A signal to an electromagnet 59 of the emergency solenoid valve 56 urges the valve to its closed position 56b so that no fluid flow through the emergency solenoid valve 56 is permitted.

The flow rate through the three-way solenoid valve 50 for affecting rotation of the wicket gate operating ring 19 may be incrementally stepped down by means of a flow diverter 60 and a flow rate control valve 61 which are arranged in series between the return line 135 and the three-way solenoid valve 50. The diverter 60 is a two-way solenoid valve having a forward state 60a which the valve assumes when an electromagnet 62 of the solenoid 60 is de-energized. When the diverter 60 is in the forward state 60a, the flow rate from the three-way solenoid valve 50 to the return line 135 is uninhibited. When the diverter electromagnet 62 is energized, the solenoid valve 60 assumes a reverse state 60b such that direct flow from the three-way solenoid valve 50 to the return line 135 is prevented and return flow from the solenoid valve 50 to the return line 135 must pass through the flow rate control valve 61. The flow rate control valve is a manually adjustable valve and can be preset to maintain a reduced flow rate through the three-way solenoid valve 50 when the diverter 60 is energized. The flow rate control valve 61 is temperature and pressure compensated such that flow rate through the flow rate control valve 61 may be accurately predetermined.

Operation of the valves (except the emergency valves) is performed by the turbine control 26. The emergency valves 42 and 56 are operated, for example, by manual operation or by loss of plant electricity which results in the valves becoming de-energized and assuming their forward states. Emergency valves such as the valves shown and their means of operation are well known in the art.

The turbine control 26 comprises a programmable controller which is programmed to receive as inputs the actual position of the turbine runner blades 15 and the wicket gate operating ring 19 as sensed by the position feedback transducers 25 and 27. The turbine control also receives as an input a signal representing the desired position for the wicket gate operating ring 19 and turbine blades 15 as sent by a turbine operator or a pre-programmed position. The turbine control 26 compares the actual positions of the turbine blades 15 and wicket gate operating ring 19 with the predetermined desired positions. The turbine control generates a first output signal when the actual position of the blade 15 is closer to the fully closed position than the desired position and when the difference between the actual and desired position exceeds a first predetermined tolerance. A second output signal is generated when the actual position of the turbine blades 15 is closer to the fully open position than the desired position and the difference between the actual and desired positions exceeds the tolerance. A third output signal is generated when the actual positions of the blades 15 differ from the desired position by an amount less than the predetermined tolerance. The third output signal is a proportional signal which has a positive or negative current depending on whether the turbine blades 15 are more open than desired or more closed than desired, respectively. The magnitude of the current is directly proportional to the absolute value of the difference between the desired position and the actual position.

The turbine control 26 also compares the actual position of the wicket gate operating ring 19 with a desired position and generates a fourth signal when the difference between the desired and actual position of the ring 19 is less than a second predetermined tolerance. The turbine control also produces a fifth signal when the wicket gate operating ring 19 is closer to a full open position than desired and a sixth signal when the wicket gate operating ring 19 is closer to a full closed position than desired.

The first hydraulic circuit 28 is responsive to the first three of the turbine control signals such that the first electromagnet 33 of the three-way solenoid valve 32 is energized when the turbine control 26 generates the first signal and the valve 32 is moved to the forward state 32a. The second electromagnet 34 is energized when the turbine control 26 generates the second signal and the valve assumes the reverse state 32b. When the turbine control 26 generates the third signal, an electromagnet 65 of the two-way solenoid valve 41 is energized and the valve 41 assumes the reverse state 41b and the servovalve 39 is responsive to the third signal such that if a positive current is received, the servovalve assumes the forward state 39a and if a negative current is received, the servovalve 39 assumes the reverse state 39b with the servovalve 39 regulating flow through the valve 39 proportionally responsive to the absolute value of the current.

The second hydraulic circuit 29 is responsive to the turbine control 26 such that when the fifth signal is generated, the first electromagnet 51 of the three-way solenoid valve 50 is energized urging the valve 50 to its forward state 50a and when the sixth signal is generated, the second electromagnet 52 is energized urging the valve 50 to its reverse state 50b. When the fourth signal of the turbine control 26 is generated, the electromagnet 62 of the diverter 60 is energized urging the diverter to its reverse state 60b.

With the control apparatus as described, the positioning of the turbine runner blades 15 and the wicket gate operating ring 19 may be controlled without the disadvantages known in the prior art from controlling the blades with only a solenoid valve or a servovalve. In a specific embodiment, the three-way solenoid valve 32 of the first hydraulic circuit 28 is a normal operation valve which is sized to permit fluid flow through the valve 32 to the turbine cylinder 17 at a flow rate sufficient to permit full stroke of the piston 18 and runner blades 15 from fully open to fully closed within a desired time limit. A typical flow rate to accomplish this is approximately eighteen gallons per minute. The three-way servovalve 39 in the first hydraulic circuit 28 is sized to provide a maximum flow rate through the servovalve 39 substantially lower than the flow rate through the normal operational solenoid valve 32. The servovalve 39 is selected to have a maximum flow rate to compensate for leakages within the hydraulic system and provide slow positioning of the turbine blades 15 whenever they approximate their desired position within the first predetermined tolerance. A preferred maximum flow rate for the servovalve 39 in the present example would be five gallons per minute and a preferred first predetermined tolerance would be 3°. Also in a preferred embodiment, the three-way solenoid valve 50 of the second hydraulic circuit 29 is sized to permit a flow rate through the valve 50 sufficient to allow the gate operating ring 19 to be rotated through its full stroke in a desired time limit. To permit the gate operating ring 19 to be rotated at a slow speed whenever it differs from its desired position by less than the second tolerance, preferably 5°, the diverter 60 causes the flow through the circuit 29 to pass through the flow control valve 61 which may be preset to slow the flow rate through the hydraulic circuit 29 to slow the rate of rotation of the wicket gate operating ring 19.

As can be seen from the foregoing description of the present invention, and its application in a preferred embodiment, the control of the turbine blades 15 can be adjusted with the normal operation three-way solenoid valve 32 operating the turbine blades through large strokes which require large flow rates through the first hydraulic circuit 28 and the servovalve 39 operating the blades 15 through small strokes. Accordingly, the disadvantages of the "bang-bang" approach of positioning the turbine blades with a solenoid valve only are eliminated and the disadvantages of inaccurate flow rates through a large capacity servovalve are eliminated. Also, the wicket gate operating ring 19 may be selectively moved at slow rotational speeds to permit a steady and unabrupt positioning of the wicket gates to prevent water hammer and to allow slow synchronization of the turbine.

From the foregoing detailed description of the present invention, it has been shown how the objects of the invention have been obtained in a preferred manner. However, modification and equivalents of the disclosed concepts such as readily occur to those skilled in the art are intended to be included in the scope of this invention. Thus, the scope of the invention is intended to be limited only by the scope of the claims as are, or may hereafter be, appended hereto.

The embodiments of this invention in which an exclusive property or privilege is claimed are defined as follows:

1. An apparatus for controlling a hydraulic turbine having a runner comprising a hub with a plurality of rotatably adjustable runner blades, a single pump supplying pressurized hydraulic control fluid, means for rotating said runner blades having a first fluid inlet and a second fluid inlet such that when fluid from said pump is admitted to said first inlet said blades are urged toward a full open position and when fluid is admitted to said second inlet, said blades are urged toward a full closed position, the apparatus comprising:

means for sensing the actual position of said blades;
   means for comparing said actual position to a predetermined desired position;
   primary valve means for admitting fluid from said pump at a constant flow rate to said first inlet when said actual position is closer to a fully closed position than said desired position and for admitting fluid to said second inlet when said actual position is closer to a fully open position than said desired position when said desired position differs from said actual position by more than a predetermined first tolerance; and
   secondary valve means for admitting fluid from said pump at a flow rate proportional to the difference between said actual and desired positions to said first inlet when said actual position is closer to a fully closed position than said desired position and for admitting fluid to said second inlet when said actual position is closer to a fully open position than said desired position when said desired position differs from said actual position by less than said predetermined first tolerance;
   means for generating a first output signal when said actual position of said blades is closer to said fully closed position than said desired position and the difference between said actual and desired positions exceeds said first tolerance; a second output signal when said actual position of said blades is closer to said fully open position than said desired position and the difference between said actual and desired positions exceeds said first tolerance; a third output signal proportional to the difference between said actual position and said fully closed position when said difference is less than said predetermined tolerance and indicating whether said actual position is closer to said fully open position than said actual position;
   said primary valve means comprising a solenoid valve having a forward state, a reverse state and a neutral state; said solenoid valve being operably connected to said pump to admit a flow of fluid through said solenoid valve to said first inlet when said solenoid valve assumes said forward state and to admit a flow of fluid through said solenoid valve to said second inlet when said solenoid valve assumes said reverse state and to block fluid flow through said solenoid valve when said valve assumes said neutral state; said solenoid valve responsive to said first output signal to assume said forward state and responsive to said second output signal to assume said reverse state; and means for urging said solenoid valve to said neutral state in the absence of a first and second output signal; and
   said secondary valve means comprising a servovalve having a forward state, a reverse state and a neutral state; said servovalve operably connected in parallel to said solenoid valve to said pump to admit a flow of fluid through said servovalve in response to said third signal with the flow rate through said servovalve proportional to said signal.

2. An apparatus according to claim 1 wherein said primary valve is sized to have a fluid flow rate capacity sufficient to urge said blade between said fully open and fully closed position within a preselected specified time limit,
   and said secondary valve means is sized to have a fluid flow rate capacity less than said primary valve and greater than an anticipated rate of leakage of fluid within said apparatus.

3. An apparatus according to claim 1 or 2 wherein said turbine includes a plurality of adjustable wicket gates; means for adjusting said gates between fully open and fully closed positions including a fluid servomotor having a first fluid inlet and a second fluid inlet such that said gates are moved toward said fully open position when fluid is admitted to said first inlet and said gates are moved toward said fully closed position when fluid is admitted to said second inlet;
   means for sensing the actual position of said gates;
   means for comparing the actual position to a predetermined desired gate position;
   main valve means for admitting fluid to said first inlet when said gates are closer to said fully closed position than said desired position and for admitting fluid to said second inlet when said gates are closer to said fully open position than said desired position; and
   means for slowing the rate of fluid flow through said main valve when said actual gate position and said desired gate position differ by an amount less than a second predetermined tolerance.

4. An apparatus according to claim 3 wherein said main valve means comprises a solenoid valve having a forward state, a reverse state and a neutral state; said main valve operably connected to a source of a pressurized fluid to permit flow of fluid through said valve to said first inlet when said valve assumes said reverse state and to permit flow through said valve to said second inlet when said valve assumes said forward state;

said means for slowing the rate of fluid flow comprising a fluid flow control valve having a flow capacity less than a flow capacity of said main valve and means for diverting fluid flow from said main valve through said fluid flow control valve.

5. An apparatus according to claim 4 comprising means for generating a fifth signal when said wicket gates are closer to a fully open position than a desired position and a sixth signal when said gates are closer to a fully closed position than said desired position and a fourth signal when said actual gate position and said desired gate position differ by an amount less than a second predetermined tolerance;

said main valve means responsive to said fifth and sixth signals with said valve assuming said forward state in response to said fifth signal and said valve assuming said reverse state in response to said sixtn signal; and said diverter means responsive to said fourth signal to divert flow to said fluid flow control valve.

* * * * *